(12) United States Patent
Larcher

(10) Patent No.: US 8,289,191 B2
(45) Date of Patent: Oct. 16, 2012

(54) HAZARD AREA PROTECTION SYSTEM

(75) Inventor: David Larcher, Fontenilles (FR)

(73) Assignee: Airbus Operations S.A.S., Toulouse (FR)

( * ) Notice: Subject to any disclaimer, the term of this patent is extended or adjusted under 35 U.S.C. 154(b) by 246 days.

(21) Appl. No.: 12/787,824

(22) Filed: May 26, 2010

(65) Prior Publication Data

US 2010/0302072 A1      Dec. 2, 2010

(30) Foreign Application Priority Data

May 26, 2009 (FR) .................................. 09 53438

(51) Int. Cl.
- *G08G 1/095* (2006.01)
- *G08G 5/04* (2006.01)
- *G08B 21/00* (2006.01)
- *A61N 9/00* (2006.01)
- *G01B 11/14* (2006.01)

(52) U.S. Cl. ........ 340/945; 340/907; 340/946; 340/961; 250/492.1; 356/615

(58) Field of Classification Search .................. None
See application file for complete search history.

(56) References Cited

U.S. PATENT DOCUMENTS

| | | | | |
|---|---|---|---|---|
| 4,916,445 A * | 4/1990 | Crossley | ........................ | 340/946 |
| 4,968,982 A * | 11/1990 | Lopez | .......................... | 342/408 |
| 5,825,305 A | 10/1998 | Biferno | | |
| 6,486,798 B2 * | 11/2002 | Rast | .............................. | 340/961 |
| 7,535,380 B2 * | 5/2009 | Bertin et al. | .................. | 340/907 |
| 2003/0058653 A1 | 3/2003 | Konicke et al. | | |
| 2005/0035881 A1 | 2/2005 | Kohlmeier-Beckmann et al. | | |
| 2006/0119839 A1 * | 6/2006 | Bertin et al. | ............. | 356/139.03 |
| 2007/0053195 A1 | 3/2007 | Alberti | | |
| 2011/0001062 A1 * | 1/2011 | Herman et al. | ............ | 250/492.1 |

FOREIGN PATENT DOCUMENTS

DE            10240227 A1        3/2004

OTHER PUBLICATIONS

French Search Report dated Jan. 13, 2010.

* cited by examiner

*Primary Examiner* — George Bugg
*Assistant Examiner* — Renee Dorsey
(74) *Attorney, Agent, or Firm* — Perman & Green, LLP

(57) ABSTRACT

A hazard area protection system wherein it includes a projection device designed to project a light beam on at least part of the surface area on the ground of the hazard area.

7 Claims, 2 Drawing Sheets

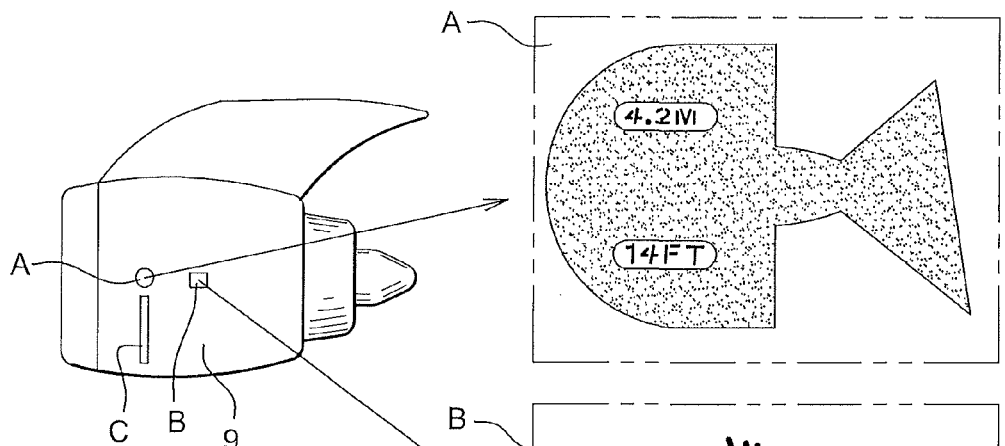
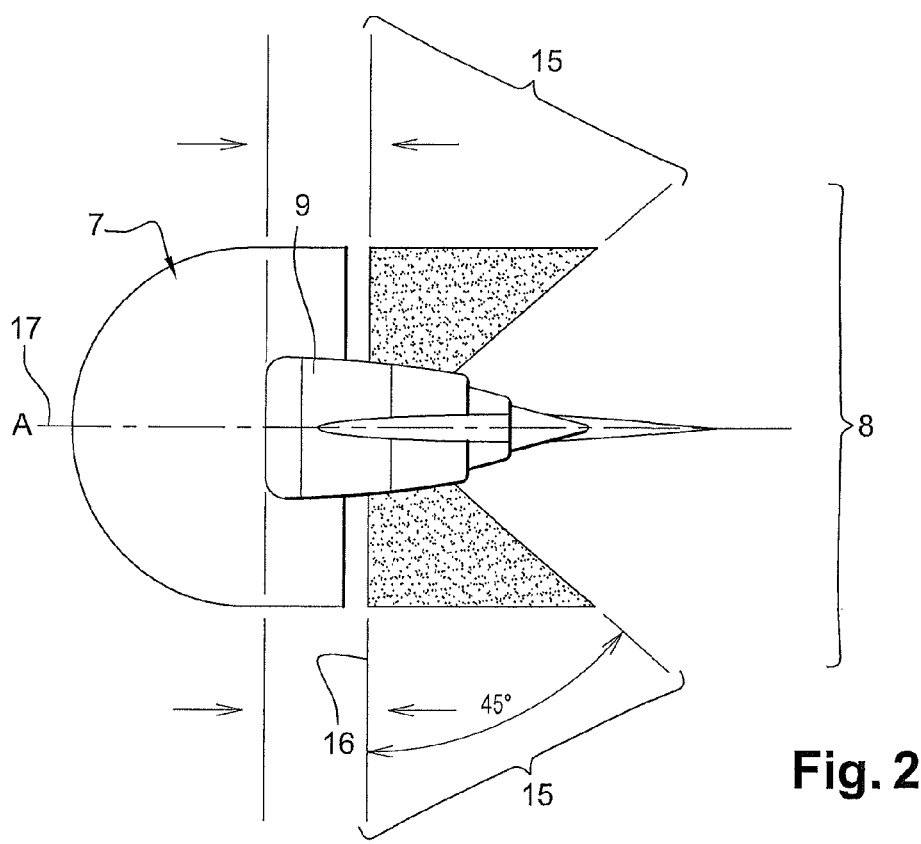

HAZARD AREA PROTECTION SYSTEM

CROSS-REFERENCE TO RELATED APPLICATIONS

This application claims priority to and the benefit of French Application No. 09 53438 filed on 26 May 2009, the disclosures of which are incorporated by reference in its entirety.

BACKGROUND

The aspects of the disclosed embodiments concern a hazard area protection system.

The marking out of hazard areas is often realized by using pictographs.

In the case of aircraft such as civil airplanes, such areas are, in particular, the engine intake and exhaust areas.

For these areas, the pictographs are arranged on the sides of the engines.

They indicate areas where no-one should be when the engines are running while the airplane is on the ground.

Indications of distances to keep to are associated with the pictographs.

An example of such a pictograph is shown in FIG. 1B.

Nevertheless it is difficult for operators to correctly visualize the distances shown and the angular extent of the corresponding area on the ground.

In addition, the hazard areas do not necessarily have a fixed surface area and, in particular in the case of an airplane engine, this area can grow or shrink depending on the engine's operating speed.

Besides this, when operators are performing a task near an aircraft engine, they cannot constantly monitor their distance from the engine.

Such a situation also occurs in other fields in which a given area is to be avoided for safety reasons.

SUMMARY

The disclosed embodiments aim to facilitate the detection by operators of areas to avoid, in particular around the engines of an aircraft, by improved marking out of these areas.

To achieve this, the disclosed embodiments propose a hazard area protection system that comprises a projection device designed to project a light beam on at least part of the surface area on the ground of the hazard area.

The projection device advantageously comprises a laser beam emitter

It comprises preferably a sweeping device designed to command the light beam to sweep an extended area.

The sweeping device causes in particular the light beam to follow a path corresponding to the marking out of the perimeter and/or of the surface area of the hazard area on the ground.

In addition, the disclosed embodiments concern an aircraft equipped with at least one system according to the disclosed embodiments and according to a first embodiment, the projection device is located on an element of the aircraft with a view on an area in front of the aircraft engines and projects the beam onto the ground in front of the engines.

Advantageously, the projection device then projects onto the ground a pattern marking out an angular sector representing an intake area of the engines of the aircraft.

According to a second alternative or supplementary embodiment, the projection device is located on an element of the aircraft with a view on an area behind the aircraft engines and projects the beam onto the ground behind said engines.

In this case, the device advantageously projects onto the ground a pattern marking out an angular sector representing an exhaust area of the engines.

According to a particularly advantageous embodiment, the protection device is linked to a computer, the computer comprising means of computing the dimensions of at least one hazard area according to parameters such as the engine speed and/or the aircraft's load and means of transmitting data describing the beam's path to the device that comprises means of altering the beam's projection area in accordance with said data.

According to a supplementary embodiment, the computer is designed to control the projection device so as to draw patterns on the ground within the projection area.

BRIEF DESCRIPTION OF THE DRAWINGS

Other features and advantages of the disclosed embodiments will become apparent in reading the following description of a non-limiting example of realization of the disclosed embodiments with reference to the drawings, which show:

in FIGS. 1A, 1B, 1C: an example of the hazard area markings on an aircraft engine according to the prior state of the art;

in FIG. 2: a marking out on the ground of the hazard areas around an aircraft engine, seen from above;

DETAILED DESCRIPTION

Figure 3:
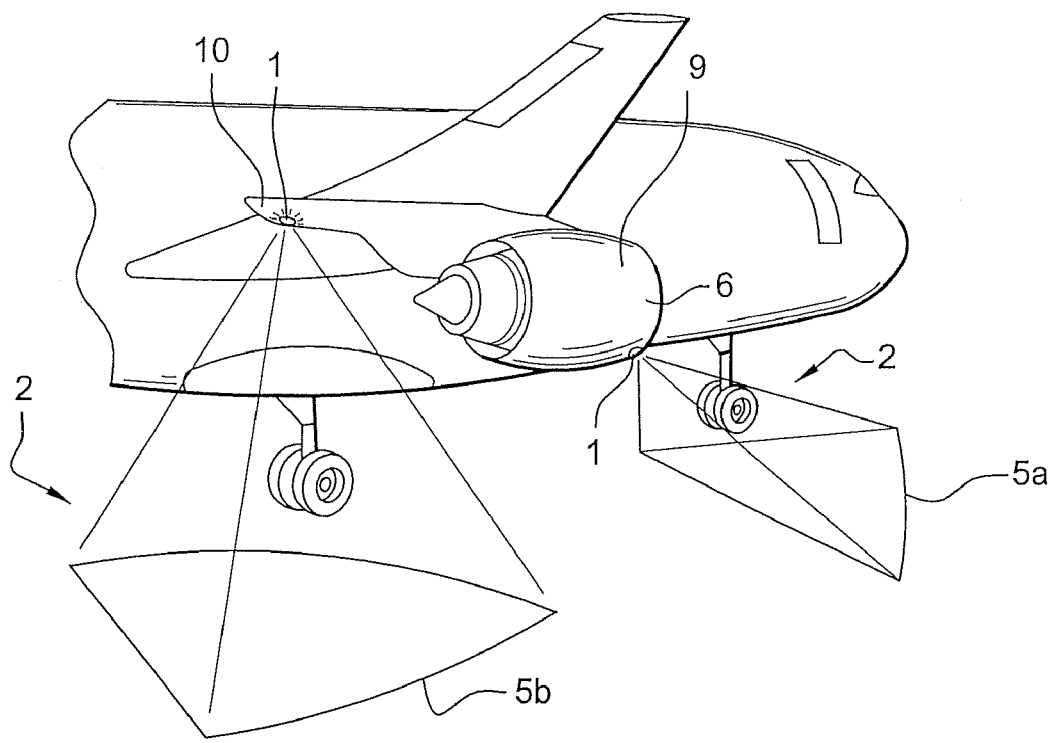
in FIG. 3: a perspective view of an example of installation of the system of the disclosed embodiments on an aircraft.

FIG. 1A shows an aircraft engine 9 fitted with hazard area markings of the prior state of the art.

The markings comprise a pictograph A enlarged in FIG. 1B that provides a representation of the hazard areas in front of and behind the engine with the distances to be respected.

In addition, the markings comprise a line C on the engine that delimits the engine intake area not to be passed forward of.

Lastly, the markings comprise a danger notice B that indicates that the areas identified on the pictograph must not be entered while the engine is running.

These indications nevertheless oblige the operator who has to work on the aircraft to assess for himself/herself the surface area of hazard areas.

FIG. 2 shows the area on the ground corresponding to the various areas around engine 9, seen from above.

The hazard areas are the engine intake area 7 at the front and the exhaust area 8 at the rear.

Access to the engine is by the sides 15 in the angular areas forming an angle of approximately 45° with respect to the normal 16 of the engine axis 17.

For an idling speed of the engine, the radius of the hazard area is of the order of 3 meters and for a fast idle it is of the order of 4 meters for an aircraft such as an Airbus A300.

The hazard area protection system of the disclosed embodiments aims to facilitate the task of operators moving on the ground around the aircraft by drawing directly onto the ground a representation of the hazard areas such that with no evaluation or computation the operators are always able to avoid the risk areas whatever the operating speed of the engine or engines.

To achieve this, as shown in FIG. 3, the system of the disclosed embodiments comprises one or more projection devices 1 designed to project a light beam 2 on at least one part of the surface area on the ground of hazard areas 5a, 5b.

To represent the forward area, projection device 1 is installed on an element 6 of the aircraft, such as the engine itself, with a view on the intake hazard area 5a in front of the aircraft's engines and projects the beam onto the ground in front of the engines.

The pattern can be simply a pattern marking out an angular sector 7 representing the intake area 5a of the aircraft's engines 9, such as the outline or perimeter of this area.

In the case where the projection device comprises means designed to emit a powerful beam, such as the case where projection device 1 comprises a laser beam emitter 3 and where it comprises a sweeping device 4 designed to guide the light beam to sweep an extended area, it is possible within the framework of the disclosed embodiments to mark out the perimeter of the area to be avoided and to draw a pattern on the ground such as stripes filling the hazard area so as to increase its visibility.

To mark out the engine exhaust areas 5b, the projection device is installed on an element 10 of the aircraft such as the back of the engine support strut as shown in FIG. 3, with a view on an area behind the aircraft engines and projects the beam onto the ground behind said engines.

The device then projects onto the ground a pattern marking out an angular sector representing the exhaust area 5b of the engine.

Figure 4:
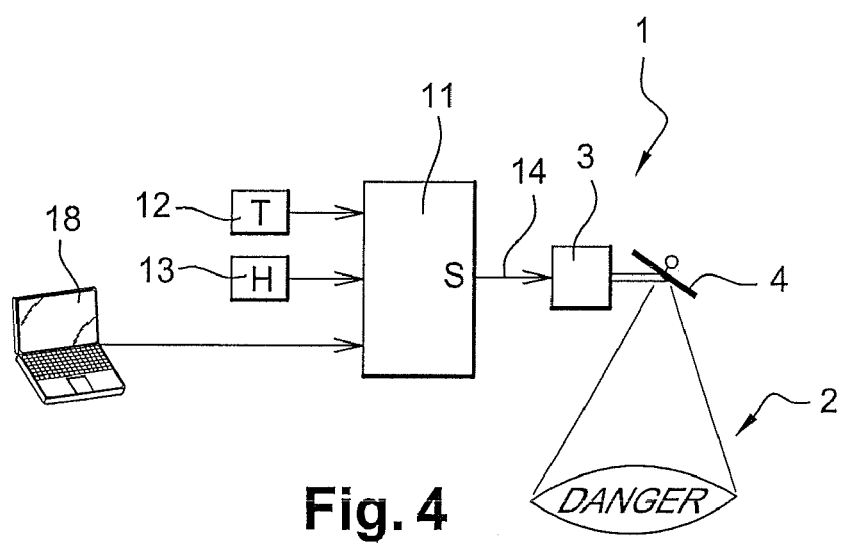
in FIG. 4: schematic view of an example of realization of a system of the disclosed embodiments.

To mark out the area, the system of the disclosed embodiments comprises, as shown schematically in FIG. 4, a sweeping device 4, such as a known mobile mirror device to guide a light beam or an emitter support device on three axes, that causes the light beam to travel along a path corresponding to the marking out of perimeter 5a, 5b and/or of the surface area of the hazard area or areas on the ground.

Still according to FIG. 4, the protection device is linked to a computer 11 designed to compute the dimensions of the hazard area to be marked out.

The computer comprises means of computing the dimensions of at least one hazard area according to parameters such as the engine speed 12 and/or the aircraft's loading 13 that will cause the aircraft's height in relation to the ground, and therefore the surface area of the hazard area, to vary depending on the greater or lower compression of the landing gear suspensions.

The computer transmits data S representing the path that the beam must follow by means 14 of transmitting data S to projection device 1 that comprises means of altering the projection area of the beam according to said data S.

Control can be achieved by using x, y orthogonal coordinates or polar coordinates to move the beam over the area to be marked out or on the perimeter of this area.

The direction of the beam will depend in the example shown on the position of mirror 4, which then depends on the data received from the computer.

The sweep of the beam follows, for example continuously, the track of the perimeter of the hazard area at a sufficient speed to give operators the illusion of an unbroken line on the ground.

As seen previously, computer 11 is, according to the example, designed to control projection device 1 so as to draw patterns on the ground in the projection area, the pattern being, according to the example of FIG. 4, an inscription repeating the word "danger" but the pattern could be any message or design chosen by means of a control system 18 linked to computer 11.

The invention claimed is:

1. Aircraft equipped with a hazard area protection system comprising:
    a projection device configured to project a light beam on at least a part of a hazard area on the ground around a running engine of the aircraft,
    wherein the projection device is installed on an element of the aircraft and projects the light beam onto the ground in at least one of a hazard area in front of the engine and a hazard area behind the engine,
    and wherein the protection device is linked to a computer comprising:
        means of computing dimensions of at least one of the hazard areas according to parameters including at least one of engine speed and aircraft loading; and
        means of transmitting data describing a path of the light beam to the projection device,
    wherein the projection device comprises means of altering a projection area of the light beam according to said data.

2. Aircraft according to claim 1 wherein the projection device comprises a laser beam emitter.

3. Aircraft according to claim 1 wherein the projection device comprises a sweeping device designed to guide the light beam to sweep an extended area.

4. Aircraft according to claim 3 wherein the sweeping device causes the light beam to follow a path corresponding to a marking out of a perimeter of the part of the hazard area on the ground.

5. Aircraft according to claim 1 wherein the projection device projects onto the ground a pattern marking out an angular sector representing an intake area of the engine.

6. Aircraft according to claim 1 wherein the projection device projects onto the ground a pattern marking out an angular sector representing an exhaust area of the engine.

7. Aircraft according to claim 1 in which the computer is designed to control the projection device so as to draw patterns on the ground within the projection area.

* * * * *